United States Patent [19]
Reisfeld et al.

[11] Patent Number: 5,783,319
[45] Date of Patent: Jul. 21, 1998

[54] WAVEGUIDE TUNABLE LASERS AND PROCESSES FOR THE PRODUCTION THEREOF

[75] Inventors: Renata Reisfeld; Dimitri Shamrakov; Yoram Sorek. all of Jerusalem, Israel

[73] Assignee: Yissum Research Development Company of the Hebrew University of Jerusalem, Jerusalem, Israel

[21] Appl. No.: 500,944
[22] PCT Filed: Nov. 23, 1994
[86] PCT No.: PCT/US94/13548
  § 371 Date: Oct. 30, 1995
  § 102(e) Date: Oct. 30, 1995
[87] PCT Pub. No.: WO95/15021
  PCT Pub. Date: Jun. 1, 1995

[30] Foreign Application Priority Data

Nov. 26, 1993 [IL] Israel ..................... 1077744

[51] Int. Cl.$^6$ ..................... H01S 3/22
[52] U.S. Cl. ............. 428/690; 372/53; 372/20; 372/40; 264/1.24
[58] Field of Search ............. 372/53, 20, 40; 428/690; 264/1.24

[56] References Cited

U.S. PATENT DOCUMENTS 4,878,226 10/1989 Kuder et al. .

OTHER PUBLICATIONS

Chemical Physics Letters, 1 Oct. 1993, Netherlands, vol. 213, Nr. 1–2, pp. 47–53 ISSN 0009–2614 Shamrakov D et al 'Superradiant film laser operation in red perylimide dye doped silica–polymethylmethacrylate composite' cited in application see p. 49, paragraph 2.

2nd International Conference Laser M2P, Grenoble, France, 9–11 Jul. 1991, ISSN 1155–44339, Journal DE Physique IV (Colloque), Dec. 1991, France, pp. 415–418. Reisfeld R 'Solid state lasers tunable in the visible spectrum and non–linear materials in glasses' see p. 416.

Applied Optics, 1 Sep. 1993, USA, vol. 32, Nr. 25, pp. 4916–4921, ISSN 0003–6935. Holmes A S et al. 'Fabrication of buried channel waveguides on silicon substrates using spin–on glass' see abstract.

Journal of Non–Crystalline Solids, Nov. 1988, Netherlands, vol. 105, Nr. 3, pp. 198–200, ISSN 0022–3093 Kobayashi Y et al. 'A transparent alumina film doped with laser dye and its emission properties' see abstract.

Properties and Characteristics of Optical Glass, San Diego, CA, USA, 18–19 Aug. 1988, ISSN 0277–786X, Proceedings of the SPIE—The International Society for Optical Engineering, 1989, USA pp. 135–142. Capozzi C A et al 'Preparation and characterization of PMMA modified SiO/sub 2/ host . . . ' see document.

Chemical Physcis Letters, 30 Apr. 1993, Netherlands, vol. 206, Nr. 1–4, pp. 15–20, ISSN 0009–2614, Lebeau B et al. 'Optical properties of a near–infrared dye laser incorporated inside sol–gel matrices' see whole document.

Applied Optics, 20 Jun. 1990, USA, vol. 29, Nr. 18, pp. 2729–2733, ISSN 0003–6935. Knobbe E T et al. 'Laser behavior and photostability characteristic of organic dye doped silicate gel materials' see whole document.

Applied Physics Letters, 13 Dec. 1993, USA, vol. 63, Nr.24, pp. 3256–3258, ISSN 0003–6951. Sorek Y et al 'Sol–gel glass waveguides prepared at low temperature' see whole document.

*Primary Examiner*—Charles Nold
*Attorney, Agent, or Firm*—Iver P. Cooper

[57] ABSTRACT

A composite glass film waveguide tunable laser is described, wherein the film is about 10–80 wt. % silica, 20–90 wt. % metal oxide, and 0–90 wt. % polyacrylate, and the film is doped with a tunable organic monomeric laserdye and deposited on a substrate, said film having a higher refractive index than that of said substrate. Processes of preparation are also disclosed.

40 Claims, 7 Drawing Sheets

R=CH(CH3)2

R=CH(CH3)2   R"=C6H4O

WAVEGUIDE TUNABLE LASERS AND PROCESSES FOR THE PRODUCTION THEREOF

The present invention relates to waveguide tunable lasers.

As is known and described, e.g., in U.S. Pat. No. 5,222,092, lasers (an acronym for "light amplification by stimulated emission radiation") are light amplifying devices which produce high intensity pulses of monochromatic light concentrated in a well-collimated beam, commonly called a laser beam. The laser beam has found wide application in photography, communications, industrial measuring instruments, and the like.

Various materials have been used as lasing media. For example, it is known that stimulated emission can be produced in various organic solutions. The first such solutions were of dyes, as reported by Sorokin, et al., *IBM Journal*, Vol. II, p. 130 (March 1967) and, since then, devices which have been used to produce such stimulated radiation have commonly been known as "dye lasers." Some materials which fluoresce or scintillate outside the visible spectrum also have been used. A compilation of materials which have served as the active material in dye lasers is provided in the above-cited article of Sorokin, et al., and in a review by Kagan, et al., in *Laser Focus*, Vol. 26 (September 1968).

U.S. patents which describe dye lasers include U.S. Pat. Nos. 3,541,470; 3,679,995; 3,684,979; 3,818,371; 4,397,023; 4,603,422, and references cited therein.

The characteristics of traditional dye lasers which make them attractive are the possibilities of wide spectral range and tunability at low cost. The laser can be operated anywhere in the visible or into the ultraviolet or infrared ranges simply by changing to a solution which emits electromagnetic radiation at the desired spectral output point.

The output wavelengths of these traditional dye lasers are also tunable, either by varying the concentration of the solution, by varying the solvent, or by introducing a wavelength selective element such as a grating reflector into the optical cavity to control the emission wavelength. Significant spectral narrowing without significant energy reduction is an additional benefit obtained with the use of a grating reflector, i.e., line widths of less than 1 Angstrom can be achieved in contrast to the 50–200 Angstrom line widths which are characteristic of dye laser emissions.

Typical dye lasers have been pumped with Q-switched ruby or glass lasers, or pumping has been accomplished with flashlamps. Pumping has been either in a longitudinal geometry, in which the pumping radiation is colinear with the optical cavity axis and the stimulated radiation, or in a transverse geometry, with the excitation beams at right angles to the optical cavity axis.

Numerous modern applications in recording, communication printing, display, etc., demand compact waveguiding lasers that can be tuned in the visible spectral range. Such a system was proposed by the present inventors about a decade ago, theoretically suggesting an introduction of laser dyes into glass films [see, e.g., R. Reisfeld, *Chem. Phys. Lett.*, Vol. 95, p. 95 (1983); R. Reisfeld, *Chem. Phys. Lett.*, Vol. 114, p. 306 (1985); and R. Reisfeld and C. K. Jorgensen, *Struct. Bonding*, Vol. 77, p. 207 (1992)].

Since then, tunable lasers based on bulk glasses prepared by the sol-gel method have been reported (see, e.g., R. Reisfeld, D. Brusilovsky, M. Eyal, E. Miron, Z. Burshtein and J. Ivri, *Chem. Phys. Letters*, Vol. 160, p. 43 (1989); R. Gvishi and R. Reisfeld, *J. de Physique*, Colloques C7, Supplement au J. de Physique III, Vol. 1, p. 199 (1991); Hsin-Tah Liu, E. Bescher, J. D. Mackenzie, Hongxing Dai, O. M. Stafsudd, *Journal of Material Science*, Vol. 27, p. 5523 (1992); B. Dunn, J. Zink, *Journal Mater. Chem.*, Vol. 1, No. 6, pp. 903–913 (1991); M. A. Meneses-Nava, T. A. S. King, *Journal Mod. Opt.*, Vol. 39, No. 7, pp. 1517–1523 (1992); and R. Reisfeld, "The State of Art of Tunable Lasers in the Visible," a lecture presented at the French-Israeli workshop, Lyon, December 5–8, 1993; however, despite repeated attempts, heretofore the present inventors have not been able to produce a stable waveguided tunable dye laser film.

Thus, e.g., following the teachings of U.S. Pat. No. 5,222,092, which relates to a laser dye impregnated silica gel monolith, our experiments have shown that immersion of a silica sol gel into a solution containing a laser dye to achieve absorption thereof, does not result in the formation of a dye laser, since neither appreciable fluorescence nor laser effect is achieved.

Un-doped waveguiding thin films made of commercial coating solutions containing silica and esters of titanic acid were prepared by P. Herrmann ["Fabrication of Planar Waveguides with High Optical Damage Threshold," *IEEE J. Quantum Electronics*, No. QE 19, p. 1735 (1983)] and by D. W. Hewak and J. W. Lit ["Standardization and Control of a Dip-Coating Procedure for Optical Thin Films Prepared from Solution," *Can. J. Phys.*, Vol. 66, p. 861 (1988)]. The procedure consists of dip-coating of the substrate, drying at 100°–150° C., and baking at 500°–1,000° C. At this temperature, hydroxyl groups evolve. The contact angle and the glass sensitivity to re-hydration decreases (passivation of the film) and the film densities, causing the refracting index to rise. Baking is, therefore, an essential stage in synthesizing all-inorganic glass waveguides. While these procedures allow preparation of waveguides with a high optical damage threshold and a low attenuation, the high temperature involved in these processes (close to the $T_g$ of the glass) prevents doping with organic dyes, which could contribute to special nonlinear and lasing properties.

Several polymeric waveguides were prepared from polyurethane and epoxy resins at low temperatures. [R. Ulrich and H. P. Weber, "Solution Deposited Thin Films as Passive and Active Light-Guides," *Appl. Optics*, Vol. 11, No. 2, p. 428 (1972)]. When doped by the laser dye Rhodamine 6G, the polyurethane films exhibited significant super radiance and an amplification of a guided laser beam.

Recently, a film laser was reported wherein an evanescent wave excites the surrounding dye solution [see G. Pendock, H. S. Mackenzie and F. P. Payne, *Electron. Lett.*, Vol. 28, p. 149 (1992)]. The efficiency of evansecent field coupling was increased by tapering a fiber up to one μ thickness in the active zone. It turns out that to create such a system involves experimental difficulties.

The operation of a side-pumped crystal waveguide laser has been demonstrated by D. C. Hanna, et al. [*Optics Commun.*, Vol. 91, p. 221 (1992)] upon an epitaxially grown Nd:YAG planar waveguide structure, presented as a 0.038 mm Nd doped layer between two undoped layers. A resonance cavity was built with two planar mirrors positioned close to the (previously polished) waveguide ends.

Especially in the case of films, the maintenance of resonance conditions with mirrors meets experimental difficulties. Another way to maintain resonant stimulated emission in films is so-called "distributed feedback" (DFB), having the advantage of lasing without any mirrored cavity.

Originally, laser oscillation in periodic structures with feedback by backward Bragg scattering was produced by inducing a periodic spatial variation, either of the refractive index n or of the gain a of the laser medium [see H. Kogelnik and C. V. Shank. *Appl. Phys. Lett.*, Vol. 18, p. 152 (1971)]. Modulation pattern of n with fringe spacing around 300 nm was induced in Rhodamine 6G doped gelatin film on a glass support, using techniques well-known from holography. Pumping this structure with Nitrogen laser radiation (above $10^6$ W/cm$^2$) resulted in laser oscillations at 630 nm with line width below 0.05 nm. DFB lasing was later explained by H. Kogelnik, C. V. Shank. *J. Appl. Phys.*, Vol. 43, p. 2327 (1972).

The strong frequency selectivity of Bragg scattering causes a DFB laser to emit light with $$\lambda_o = 2n\Lambda \quad (1)$$

where $\Lambda$ is the period of the spatial modulation of n or of the gain α. The emission frequency of the laser can be varied by modifying $\Lambda$.

J. E. Bjorkholm and C. V. Shank, *IEEE J. Quant. Electron.*, Vol QE8, p. 833 (1972), describe depositing Rhodamine 6G doped polyurethane thin film upon a microscope slide, which was used as an active medium. DFB and gain modulation were obtained optically by pumping the thin film with fringes formed by the interference of two coherent beams. Laser generation was observed to be readily tunable in the vicinity of 600 nm, with line widths about 0.02 nm.

A similar tunable thin-film DFB laser was constructed as a quartz prism coated with Rhodamine 6G doped polymethyl-methacrylate (PMMA) film. [See A. A. Zlenko, A. M. Prokhorov, V. A. Sychugov, *Sov. J. Quant. Electron.*, Vol. 3, p. 493 (1974)].

In I. V. Cheremiskin and T. K. Chekhlova, *Sov. J. Quant. Electron.*, Vol. 4, p. 387 (1974), a quartz plate coated with Rhodamine 6G doped PMMA film was also applied, wherein DFB was provided by creation of an interference pattern on the film by intrinsic total reflections of the pumping beam inside the support plate.

Such films, however, have been found to be unstable already, after only several hundred pulses.

A practical DFB laser on dye solution has been constructed, using special prism-cuvette-provided creation of interference fringes inside the dye solution [see A. N. Rubinov and T. S. Efendiev, *Zh. Prikl. Spectrosk.*, Vol. 27, p. 634 (1977). This laser, with a set of 14 dyes, exhibited tunability in the range of 400–1,000 nm, with spectral width of generated line about 0.01–0.03 nm and slope efficiency of 3–21%, depending on the dye applied.

In Z. Bor, *IEEE J. Quant. Electron.*, Vol. QE 16, p. 517 (1980), introducing holographic grating into pumping pathways enabled tunable picosecond pulse generation on a Rhodamine 6G solution DFB laser. DFB laser generation was coupled into a quartz optical fiber surrounded by a gain modulated dye solution of lower refractive index, when coupling occurred due to evansecent field interaction. Multimode emission of about 0.01 nm spectral width and conical image were observed on the fiber ends, which were of 0.05 nm diameter. The Rhodamine 6G solution was pumped through a quartz capillary jacket surrounding the fiber. [See N. Periasamy and Z. Bor, *Optics Commun.*, Vol. 39, p. 298 (1981)].

As mentioned above, the simplest way to obtain DFB is to modulate the gain and refractive index of film by interference pattern corresponding to the requirements of Bragg condition. Such a pattern may be obtained by interference of two coherent beams crossing at angle q:

$$\Lambda = \lambda_p / (2 \sin q) \quad (2)$$

where $\lambda_p$ is the wavelength of the pump radiation, providing at the same time excitation of the dye.

In the case of active film supported by an optically different material, the combination of (1) and (2) gives:

$$\lambda_o = n_2 \lambda_p / (n_1 \sin q) \quad (3)$$

where $n_2$ represents the refractive indexes of the film, and $n_1$ represents the support materials.

For the prism-cuvet arrangement described above, the Bragg condition transforms into the following shape:

$$= \frac{n_2 \lambda_p}{n_1 \sin \theta} = \frac{\sqrt{2} \; n_2 \lambda_p}{\sqrt{n_2 - \sin^2 i} + \sin i} \quad (4)$$

where i is the incidence of the pumping beam relating to the uncoated prism surface.

More recently, an optical amplifier and then also a laser configuration were based on a thin flowing dye solution layer, sandwiched between two prisms of higher refractive index. It was found possible to couple external radiation to leaky modes supported by an active layer excited with an additional laser under certain resonant angles [see S. N. Mendenhall, O. M. Stafsudd and N. G. Alexopoulos, *J. Appl. Phys.*, Vol. 66, p. 4645 (1989); M. J. Halmos and O. M. Stafsudd, *Applied Optics*, Vol. 29, p. 2760 (1990); and M. J. Halmos, T. M. Fletcher and O. M. Stafsudd, *Applied Optics*, Vol. 31, p. 4132 (1992)].

In all applications observed above, a significant superfluorescence or lasing in waveguide structures was successfully achieved, either upon solids doped by rare earth ions, upon organic laser dyes trapped in polymer films, or upon dye solutions only. The only organic colorants which exhibit laser emission in the visible range in such devices are quite unstable in polymeric materials during substantial excitations, or are not practical if used as circulating solutions.

Several months ago, the present inventors reported the introduction of an organic laser dye into a silica-polymethylmethacrylate composite film. Thus, the challenge to combine the advantages of solid state lasers with opportunities of organic dyes was finally met, by entrapping organic laser dyes inside silica-PMMA composite glass. Doped by perylimide dyes, this material is highly photostable. [See D. Shamrakov and R. Reisfeld, "Superradiant Film Laser Operation in Red Perylimide Dye Doped Silica-Polymethylmethacrylate Composite," *Chem. Phys. Lett.*, Vol. 213, pp. 47–53 (1993)].

However, said combination resulted in a superradiant film laser operation and, unfortunately, did not result in a waveguided tunable dye laser.

Thus, despite the fact that the concept of introducing laser dyes into glass films was first proposed by the present inventors over ten years ago, and despite constant and repeated attempts to reduce said concept to practice, heretofore noone has succeeded in preparing a thin film waveguide tunable organic dye laser.

The present invention provides, for the first time, high optical quality waveguiding thin film tunable dye lasers, having tunable organic laser dyes incorporated therein.

Waveguided tunable laser emission was observed in the visible spectral range in films doped by perylimide, oxazine, xantene, cyanine and merocyanine dyes, and, based on the teachings of the present invention, it will now be possible to incorporate a large number of organic laser dyes into thin waveguiding films. Laser action has been observed when pumped by the second harmonic of Nd:YAG laser, with a low threshold of less than 50 µJ.

In accordance with the present invention, there is now provided a composite glass film waveguide tunable dye laser, said film comprising about 10–80 wt. % of a multiplicity of cross-linked networks of silica, said silica networks being optionally modified to include hydrocarbon chains having 2–6 carbon atoms and containing at least one double bond or an oxiran group; about 0–90 wt. % of a network-forming or network-modifying amount of a metal oxide selected from the group consisting of titania, zirconia, alumina, germania, yittria, or a mixture thereof; and about 0–90 wt. % of a multiplicity of polyacrylate chains intertwined with said networks, wherein said film is doped with a tunable organic monomeric laser dye and deposited on a substrate, said film having a higher refractive index than that of said substrate.

The present invention also provides a process for the preparation of a composite glass film waveguide tunable dye laser, comprising about 10–80 wt. % of a multiplicity of cross-linked networks of silica, said silica networks being optionally modified to include hydrocarbon chains having 2–6 carbon atoms and containing at least one double bond or an oxiran group; and about 0–90 wt. % of a multiplicity of polyacrylate chains intertwined with said networks and doped with a tunable organic monomeric laser dye, said process comprising the steps of:

a) forming a solution of at least one alkoxysilane precursor, water, ethanol and a catalyst to effect the hydrolysis of said precursor;

b) adding a solvent selected from the group consisting of benzene and toluene;

c) effecting azeotropic distillation of the resulting solution to remove water and alcohol;

d) adding glacial acetic acid and distilling off said original solvent while adding a tunable organic monomeric laser dye, whereby said benzene or toluene are replaced with glacial acetic acid and any water entrained in said dye is removed by said distillation;

e) introducing a polyacrylate of the general formula I:

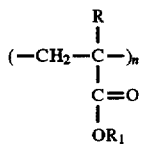

wherein:

R is hydrogen, methyl or ethyl;

R₁ is hydrogen, methyl or ethyl, and n is a whole integer greater than 100 into the remaining solution; and f) distilling off said glacial acetic acid, whereby there is formed a silica polymer composite glass solution doped with a tunable organic monomeric laser dye and suitable for thin layer coating on a substrate having a refractive index lower than that of said film, to form a composite glass film waveguide tunable dye laser.

The invention further provides a composite glass film waveguide tunable dye laser, comprising about 10–80 wt. % of a multiplicity of cross-linked networks of silica, said silica networks being optionally modified to include hydrocarbon chains having 2–6 carbon atoms and containing at least one double bond or an oxiran group; about 20–90 wt. % of a network-forming or network-modifying amount of a metal oxide selected from the group consisting of titania, zirconia, alumina, germania, yittria, or a mixture thereof, and doped with a tunable organic monomeric laser dye, said process comprising the steps of:

a) forming a solution of at least one alkoxysilane precursor, a tunable organic monomeric laser dye, a metal alkoxide precursor and ethanol and effecting the hydrolysis of said metal alkoxide precursor by stirring the solution in an atmosphere saturated with water vapor; and b) adding water with catalyst, to effect the hydrolysis of said alkoxysilane precursor; whereby there is formed a silica metal oxide composite glass solution doped with a tunable organic monomeric laser dye and suitable for thin layer coating on a substrate having a refractive index lower than that of said film, to form a composite glass film waveguide tunable dye laser.

The present invention also provides a process for the preparation of a composite glass film waveguide tunable dye laser, comprising about 10–80 wt. % of a multiplicity of cross-linked networks of silica, said silica networks being optionally modified to include hydrocarbon chains having 2–6 carbon atoms and containing at least one double bond or an oxiran group; about 20–90 wt. % of a network-forming or network-modifying amount of a metal oxide selected from the group consisting of titania, zirconia, alumina, germania, yittria, or a mixture thereof, and doped with a tunable organic monomeric laser dye, said process comprising the steps of:

a) forming a solution of at least one metal alkoxide, alcohol selected from the group consisting of ethanol, propanol and butanol, carboxylic acid selected from the group consisting of acetic acid and propanoic acid, and at least one organically modified silane;

b) adding a tunable organic monomeric laser dye in concentration of from $10^{-2}$ to $10^{-4}$M;

c) boiling the solution under reflux for several hours for homogenous generation of water by the esterification reaction of the alcohol and the carboxylic acid;

d) filtering the solution through a 0.1–0.2 mm pore size membrane;

e) dip-coating or spin-coating on a glass or quartz substrate having a refractive index lower than that of said coating film;

whereby there is formed a metal organically-modified silica composite glass film tunable dye laser doped with a tunable organic monomeric laser dye.

The invention still further provides a process for the preparation of a composite glass film waveguide tunable dye laser, comprising about 20–80 wt. % of a multiplicity of cross-linked networks of silica, said silica networks being optionally modified to include hydrocarbon chains having 2–6 carbon atoms and containing at least one double bond or an oxiran group; about 20–90 wt. % of a network-forming or network-modifying amount of a metal oxide selected from the group consisting of titania, zirconia, alumina, germania, yittria, or a mixture thereof; and about 20–90 wt. % of a multiplicity of polyacrylate chains intertwined with said networks and doped with a tunable organic laser dye, said process comprising the steps of:

a) forming a solution of at least one alkoxysilane precursor, a tunable organic manomeric laser dye, a metal alkoxide precursor and ethanol and effecting the hydrolysis of said metal alkoxide precursor by stirring the solution in an atmosphere saturated with water vapor; and b) adding water with catalyst, to effect the hydrolysis of said alkoxysilane precursor;

c) adding a solvent selected from the group consisting of benzene and toluene;

d) effecting azeotropic distillation of the resulting solution to remove water and alcohol;

e) adding glacial acetic acid and distilling off said original solvent while adding an indicator dye, whereby said benzene or toluene are replaced with glacial acetic acid and any water entrained in said dye is removed by said distillation;

f) introducing a polyacrylate of the general formula I:

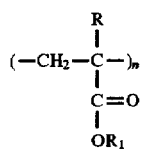

wherein:

R is hydrogen, methyl or ethyl;

$R_1$ is hydrogen, methyl or ethyl, and n is a whole integer greater than 100 into the remaining solution; and g) distilling off said glacial acetic acid, whereby there is formed a silica-polymer composite glass solution doped with a tunable organic monomeric laser dye and suitable for thin layer coating on a substrate having a refractive index lower than that of said film, to form a composite glass film waveguide tunable dye laser.

Preferably, in the above formula, n is between 100 and 1,000, R can have different values in the same polymer, and $R_1$ can also have different values in the same polymer.

As will be realized from the above, the objects of the present invention have now been achieved by recognizing the necessity to adjust the sol-gel matrix to obtain a polarity balance with the selected organic dye, so that the laser dye will be dispersed in monomeric form and so that the laser molecules do not form dimers or higher aggregates which dissipate the excitation energy by non-radiative energy transfer.

Furthermore, it has been found that to produce a waveguide tunable dye laser on the preferred substrate of glass, it is necessary to adjust the components of the matrix so that the deposited film has a higher refractive index than that of said substrate.

Thus, in preferred embodiments of the present invention, said film comprises at least 30 wt. % of one of said metal oxides, to increase the refractive index of said film above the refractive index of said substrate.

Preferably, said metal oxide is selected from the group consisting of alumina, titania, zirconia, and mixtures thereof.

Especially preferred are films comprising 30–65 wt. % titania, films comprising 30–65 wt. % zirconia and films comprising 30–90 wt. % alumina.

Furthermore, the addition of metal oxides, between 30–50 wt. %, dramatically increases the thermal conductivity of the film, thus allowing dissipation of heat that optimizes the laser action, its efficiency and its stability. In addition, the metal oxides in the glass increase the mechanical stability of the films.

In the above process, it is preferred that the said alkoxysilane precursors have one to four carbon atoms in each of said alkoxy groups; tetraalkoxysilanes, such as tetramethoxysilane, tetraethoxysilane, tetrapropoxysilane and tetrabutoxysilane are preferred.

In an especially preferred embodiment of the present invention, said precursors are tetraalkoxysilane intermixed with a trialkoxysilane derivative having a $C_2$–$C_6$ unsaturated aliphatic chain with one or two double bonds.

Preferred polyacrylates for use in the present invention are polymethylmethacrylate, polyethylmethacrylate, polyacrylic acid and polymethacrylic acid.

When organic groups are integrated in the glass, the shrinkage is low because the bulky organic components fill the pores between the inorganic oxide chains. The material reaches its final density at low temperature, especially if the organic groups can cross-link by epoxy or methacryl polymerization.

The waveguiding properties of the films are achieved by coating them on either optical quality quartz, glass, metal or fused silica supports of planar or tubular shapes with lower refractive index. Laser action in the waveguides is obtained when doping them by appropriate organic laser dyes, said rhodamines, coumarines, oxazines, DCM, perylimide dyes and other existing laser dyes. The resonance conditions in these active waveguides are achieved by either mirrored cavity, when the mirrors are attached directly to the waveguide ends, or by DFB, while the tunability is achieved by applying of either variable DFB configuration or adjustable grating in Littrow configuration as a component of mirrored cavity mentioned hereinabove. An unstable laser cavity is achieved in the waveguide without additional or external mirrors or gratings. The slope efficiency of waveguide laser devices described herein reaches about 20% value, relative to the absorbed pumping energy.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
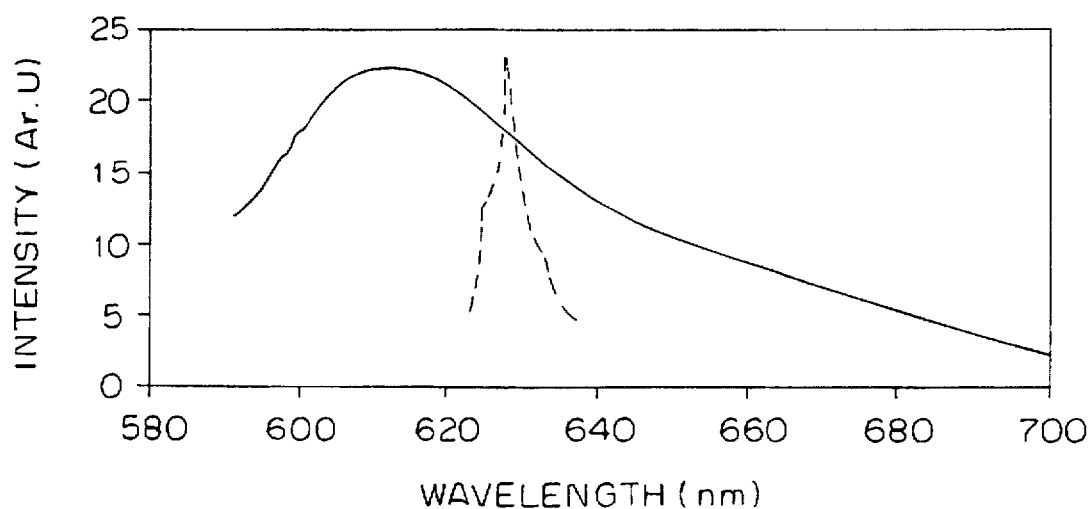
FIG. 1 represents the spontaneous fluorescence of Lumogen LFR 300 (solid line) and the guided ray spectrum (dashed line)

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Preparation of Waveguiding Laser Films

Materials:

Titanium tetraethoxide, titanium tetraisopropoxide, GLYMO (τ-GLYcidyloxipropyltriMethOxysilane), phenyltriethoxysilane, TEOS (tetraethoxysilane), $Si(OC_2H_5)_4$ were purchased from Aldrich. Glacial acetic acid, propionic acid, propanol and absolute ethanol were purchased from Frutarom.

General Procedure:

Titanium tetraalkoxides (titanium tetraethoxide or titanium tetraisopropoxide) and tetraalkoxysilane are dissolved in a mixture of alcohol and a carboxylic acid (acetic or propionic acid). The hydrolysis is performed by slow addition of water to the solution, to avoid $TiO_2$ precipitation or uncontrolled gelation, or by homogenous generation of water through a water-generating esterification reaction. The ormosie is added before or after the hydrolysis. The solution is filtered and the films are prepared either by dip-coating or by spin-coating on glass or quartz substrate.

A typical procedure used: 15 ml of Et-OH, 5 ml AC-OH, 7 ml $Ti(OEt)_4$, 4.2 ml GLYMO (molar ratio Ti:GLYMO 1.75:1). The solution was boiled under reflux for 4 hours for water generation by esterification reaction, cooled for ½ hour to room temperature, and filtered. Films were prepared by dip-coating at a withdrawal speed of 20 cm/min. The dip-coating procedure was performed on a clean table (Class 100). Doped glass was prepared by the dissolution of red perylimide dye Lumogen LFR 300 (BASF) at concentration of about $10^{-3}$M into the original solution before the reflux stage.

The control of the refractive index is achieved by changing the ratio between the titanium and the ormosil; in titanium GLYMO films from titanium tetraethoxide and the ormosil GLYMO, $n(X)=1.42+0.31 X$, where n is the refractive index at 633 nm and X is the titanium molar ratio. In films made of titanium tetraisopropoxide and GLYMO, $n(X)=1.42+0.28 X$. When the organic content of the glass was reduced by replacing half the GLYMO with TEOS $(Si(OEt)_4)$, the refractive index rose from 1.57 (at 50% Ti) to 1.60. Another possibility of increasing the refractive index is to replace the organic aliphatic part of the ormosie by aromatic groups that cause the refractive index to increase via their π electrons. Replacing the GLYMO by phenyltriethoxysilane caused an increase in refractive index from 1.60 to 1.63.

The control of the film thickness is achieved either by changing the withdrawal speed in dip-coating or the spinning rate in spin-coating, or by changing the concentration of the coating solution.

Optical Characterization:

An He-Ne laser beam was used, coupled into the film by means of a rutile prism. The propagation constants of three modes were determined by measuring the coupling angles into the prism. Typically, three TE and TM modes were found. The refractive index of the film and its thickness were determined by fitting the propagation constants to a step index slab model. The term nd (n being the refractive index, and d the film thickness) was independently determined from the interference pattern obtained with a Lambda-5 spectrometer, using the formula:

$$nd\,(1/\lambda_1/\lambda_2)=1$$

where $\lambda_1$, $\lambda_2$ are wavelengths of neighboring maxima or minima.

Laser Properties:

Waveguiding films were doped by a variety of dyes, including perylimide dyes, Rhodamines (Rhodamine 6G, Rhodamine 610), DCM, Kiton red and acridines. In films doped by Lumogen LFR 300 (BASF), Rhodamine 6G, Rhodamine 610, DCM, a significant spectral narrowing of the guided ray that evolves from the film edge or coupled out by a prism is observed, when pumping a strip along the guide by Nd-YAG second harmonics laser pulse. The ray power dependence in the pumping power shows a threshold behavior typical to a laser or super radiant system.

Figure 2:
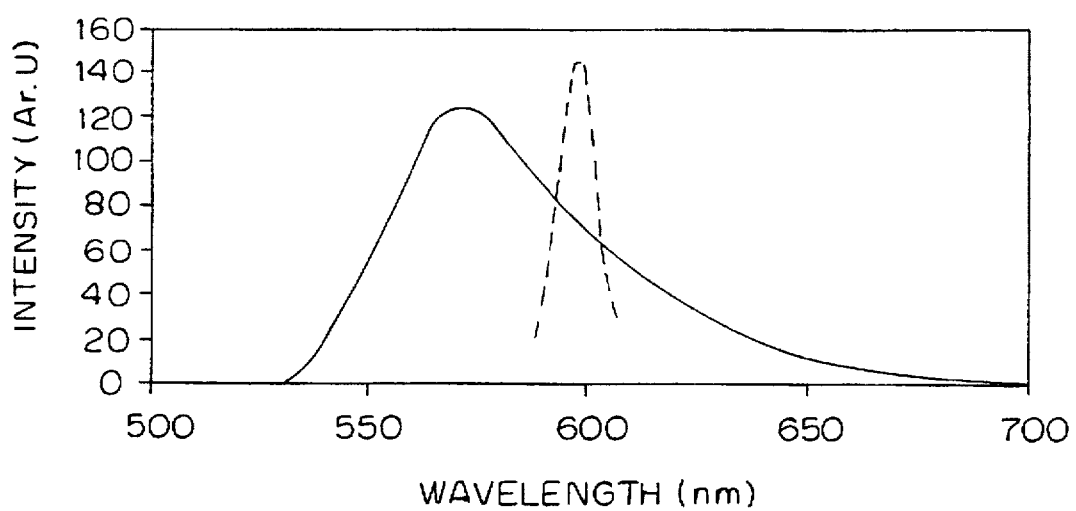
FIG. 2 represents the spontaneous fluorescence of Rhodamine 6G (solid line) and the guided ray spectrum (dashed line)
Figure 3:
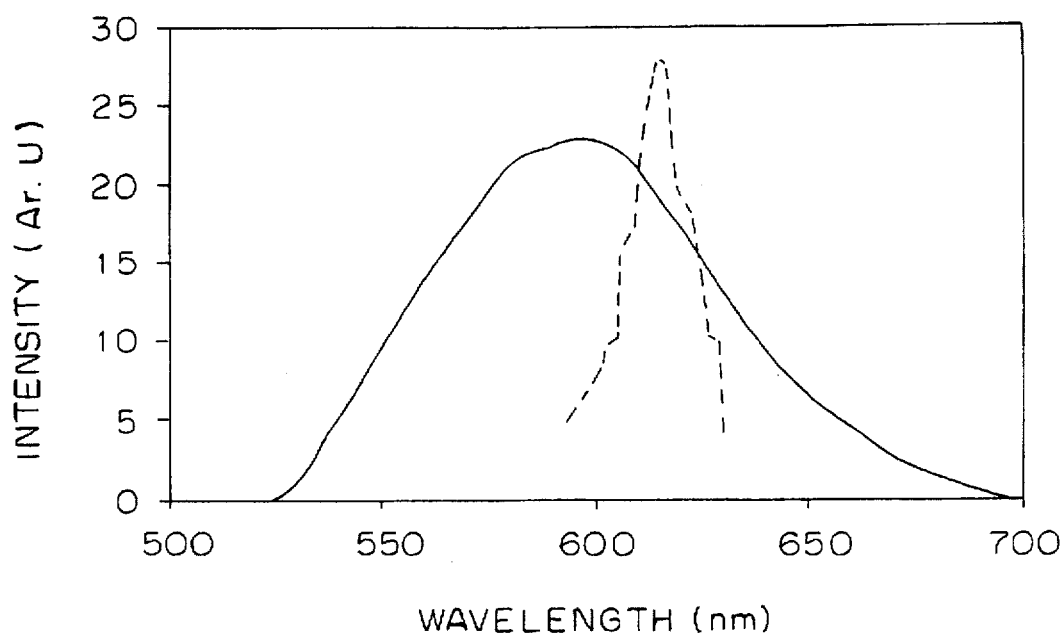
FIG. 3 represents the spontaneous fluorescence of DCM (solid line) and the guided ray spectrum (dashed line)

Examples of spectral narrowing are given in FIGS. 1–3 appended hereto.

Figure 4:
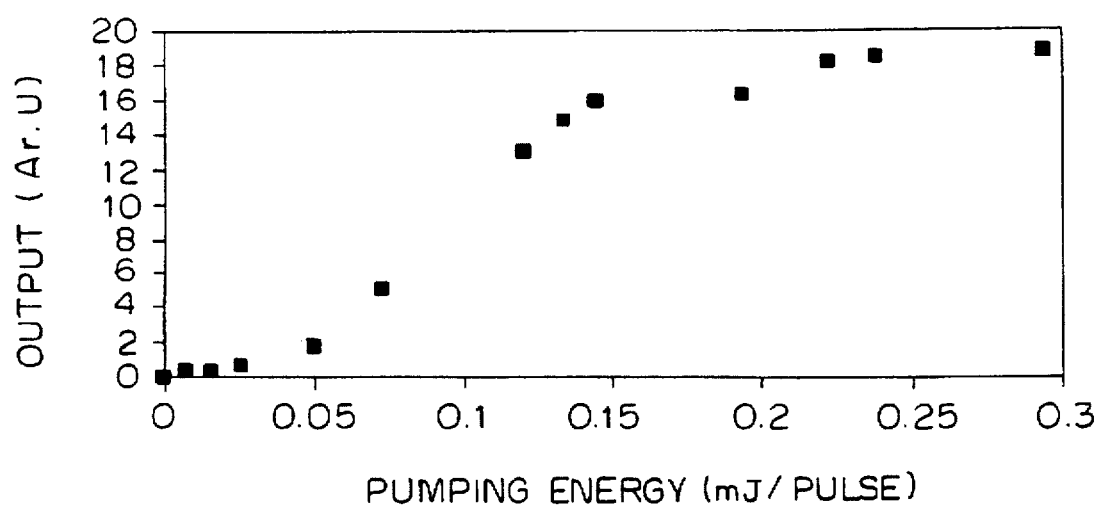
FIG. 4 represents the output energy dependence on pumping energy in R6G doped waveguiding film.
Figure 5:
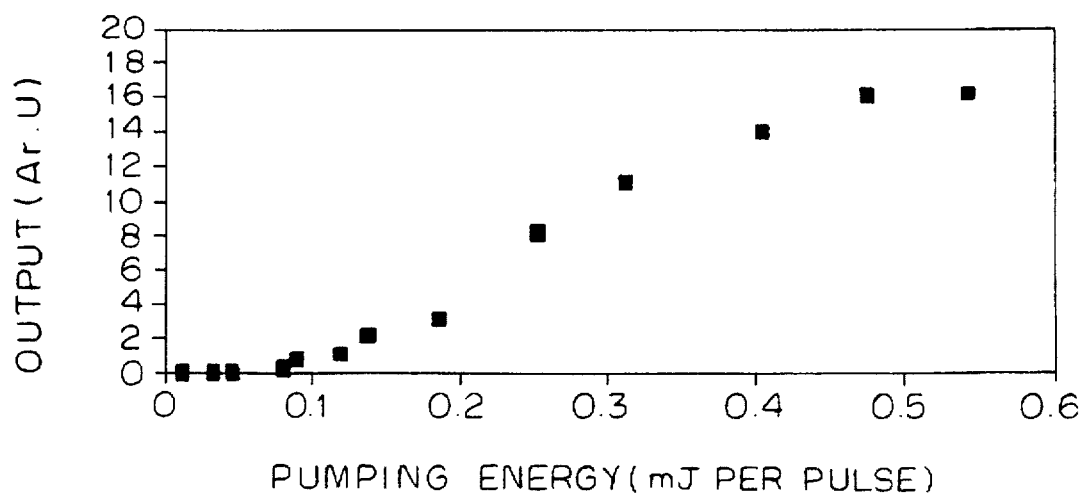
FIG. 5 represents the output energy dependence on pumping energy in DCM doped waveguiding film.
Figure 6:
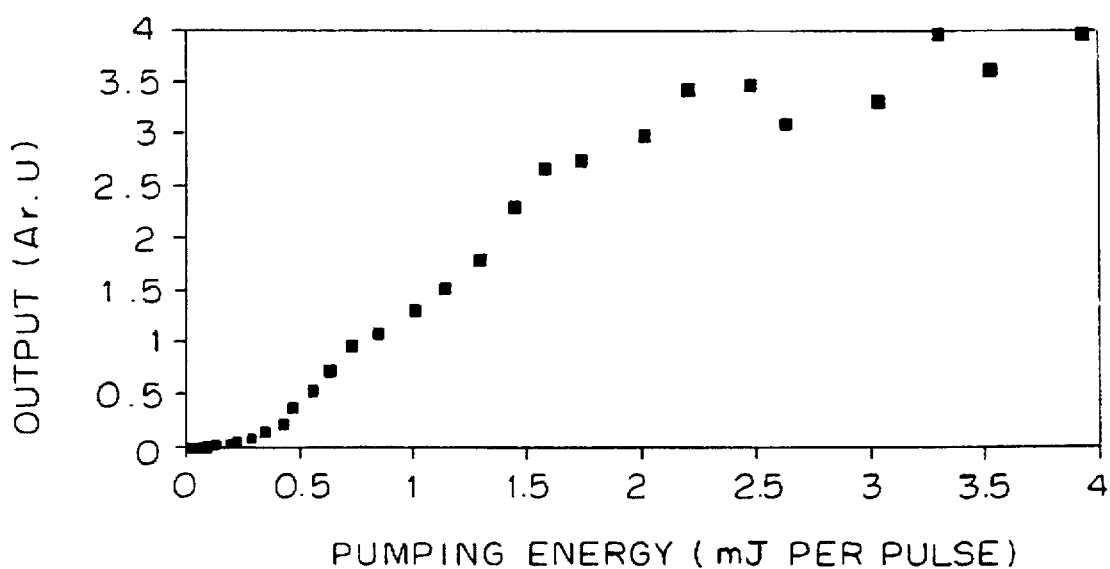
FIG. 6 represents the output energy dependence on pumping energy in Lumogen LFR 300 doped waveguiding film.

The functional dependence of the guided ray intensity on pumping energy was measured in film doped by several laser dyes. Typical results are presented in FIGS. 4–6 appended hereto.

Figure 7:
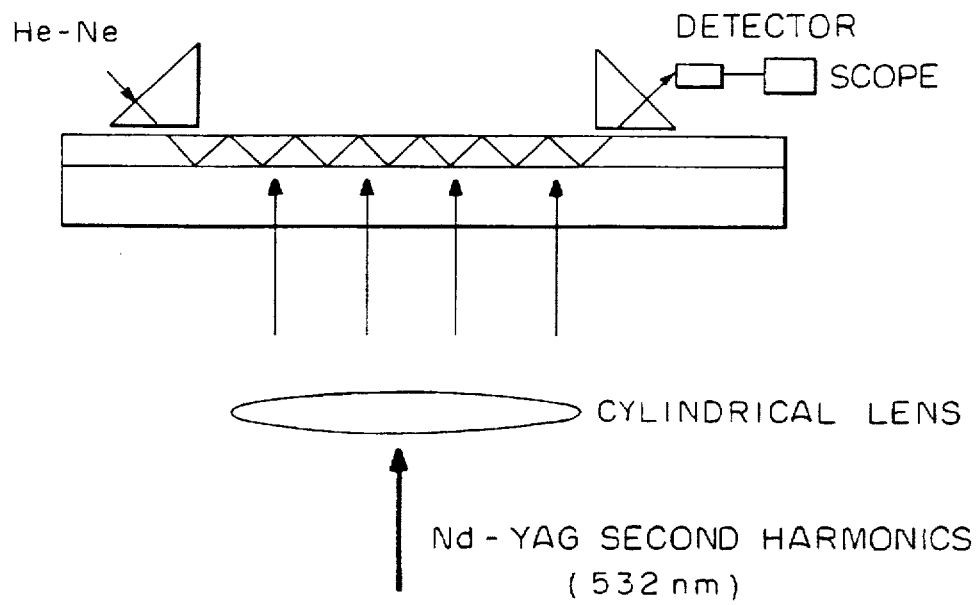
FIG. 7 is a schematic representation of the amplification experiment described hereinbelow.
Figure 8:
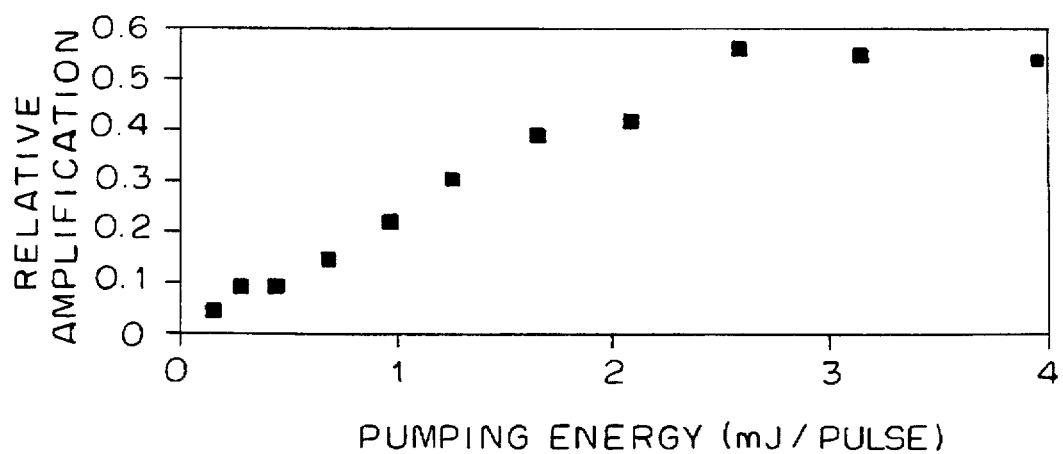
FIG. 8 represents the guided beam amplification as a function of the energy of the pumping pulses.

Laser Amplification in the Film:

An He-Ne beam (632.8 nm) was coupled in and out of the Lumogene LFR 300 doped film by two routile prisms: a Nd-YAG laser second harmonic radiation was focused by a cylindrical lens on the guided beam, as shown in FIG. 7. FIG. 8 represents the guided beam amplification as a function of the pumping pulse energy.

EXAMPLE 2

The precursors tetraethoxysilane [TEOS; $Si(OC_2H_5)_4$] and triethoxyvinylsilane [TEVS; $CH_2=CHSi(OC_2H_5)_3$] were purchased from Fluka and Merck. Polymethylmethacrylate (PMMA) of low molecular weight was purchased from BDH, and glacial acetic acid, benzene and absolute ethanol from Frutarom.

First, an ordinary sol-gel technique was applied to a homogeneous solution of TEOS, TEVS, water and ethanol in appropriate molar ratio of 0.3:0.7:4:11, in a total volume of 30 ml, and a few drops of glacial acetic acid, hydrochloric acid, nitric acid, or sulfuric acid were added as catalyst. After the hydrolysis of precursors was completed after 2 hours of stirring, 25 ml of anhydrous solvent, e.g., benzene or toluene, were added. The rest of the water was removed by azeotropic distillation at 65° C. Then the medium was changed with glacial acetic acid by distillation, and solutions of PMMA (1.23 g in acetic acid) and Lumogen LFR 300 dye were added. The excess acetic acid was distilled out to reach the initial volume. A perfectly clear colloidal solution, stable for a term of up to one month and containing both silica and polymer species, was obtained as a result. The derived solid composite material contains 50 wt. % silica.

The films were prepared either by dip-coating, spin-coating, or spread-coating, on quartz glass slides. Crack-free films were prepared of up to 0.015 mm thickness. The photostability of the doped films was tested with 60 MW/cm$^2$ and 10 Hz repetition rate from a Nd:YAG laser. No bleaching or other damage was observed after hundreds of pulses. The density of the films was as high as 1.68 g/cm$^3$, and their refractive index was 1.48, providing the films' waveguiding properties when coated upon quartz supports (refractive index, 1.46 at 633 nm). The film edges were made completely flat for laser measurements.

Figure 9:
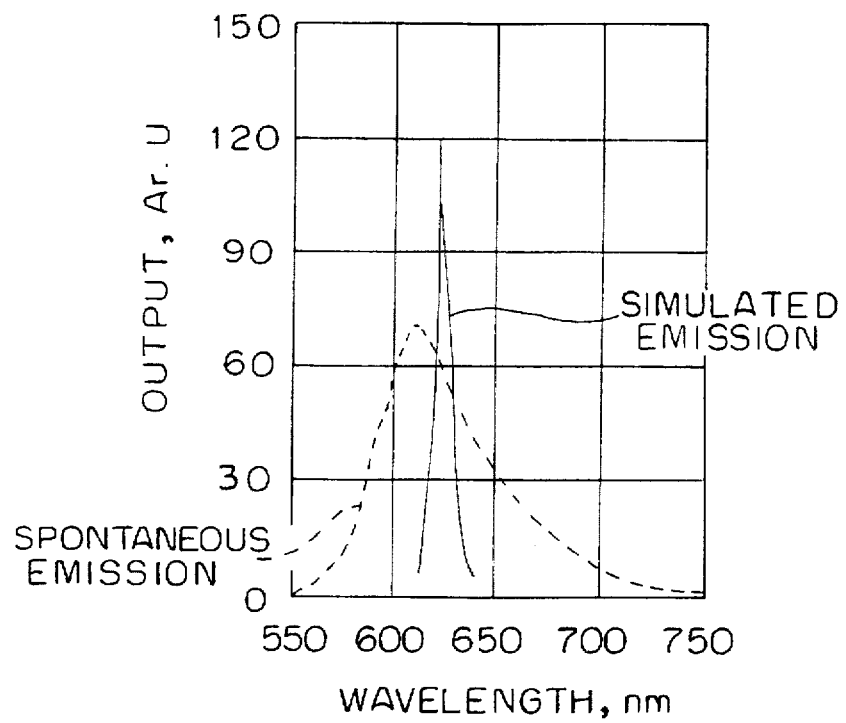
FIG. 9 presents spontaneous and stimulated emission spectra of Lumogene LFR 300 dye in composite glass film.
Figure 10:
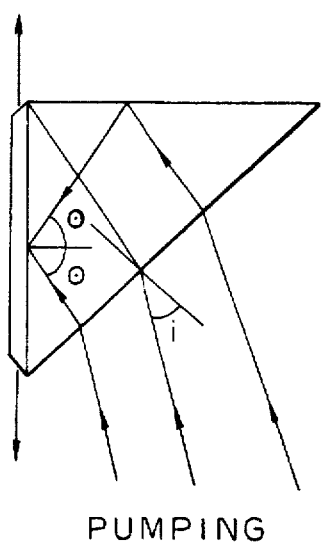
FIG. 10 schematically represents a tunable DFB laser device.
Figure 11:
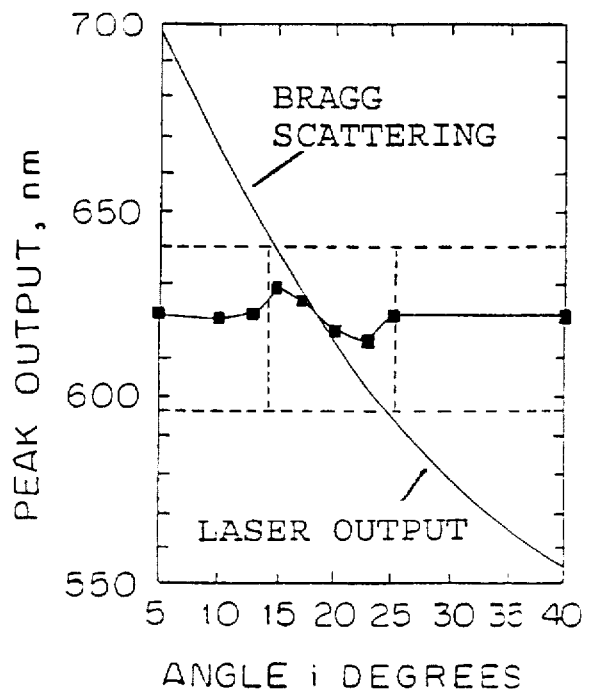
FIG. 11 represents the tuning of Lumogen LFR 300 composite glass film laser output wavelength when pumped in combination with prism, showing both Bragg scattering and laser output.

A typical laser spectrum is presented in FIG. 9. A tunability in the range of 615–630 nm was achieved on film coated upon the quartz prism, as shown in FIG. 10. The tunability spectrum is presented in FIG. 11 in comparison to that of calculated backward Bragg scattering.

EXAMPLE 3

Figure 12:
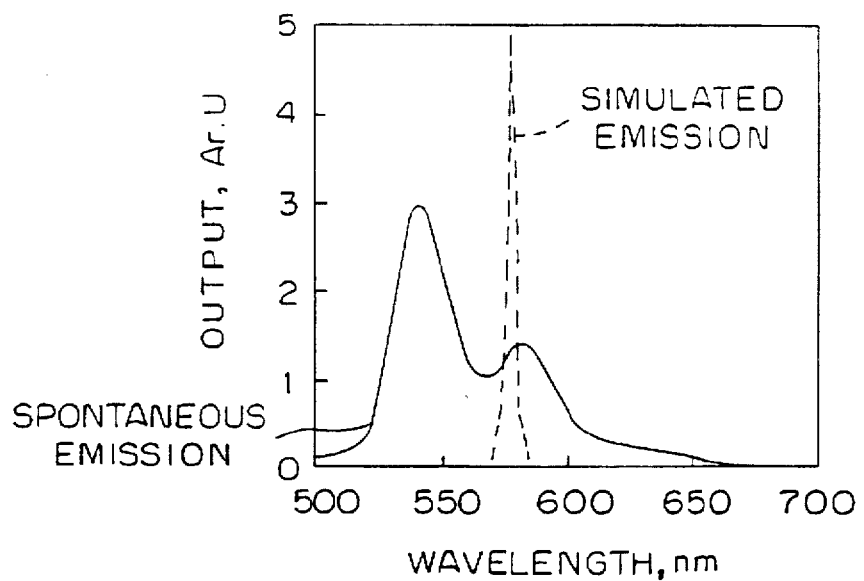
FIG. 12 presents spontaneous and stimulated emission spectra of Lumogene LFR 240 dye in composite glass film.
Figure 13:
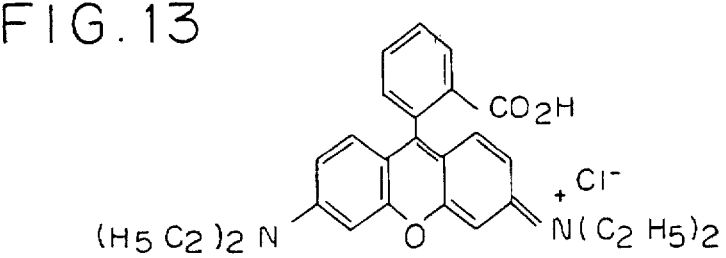
FIG. 13 illustrates the structure of Rhodamine 610.
Figure 14:
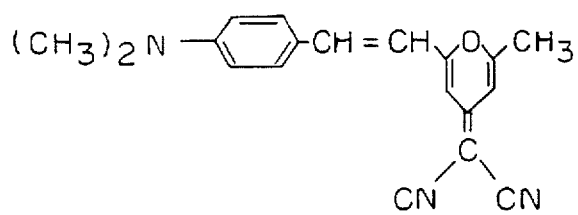
FIG. 14 illustrates the structure of DCM.
Figure 15:
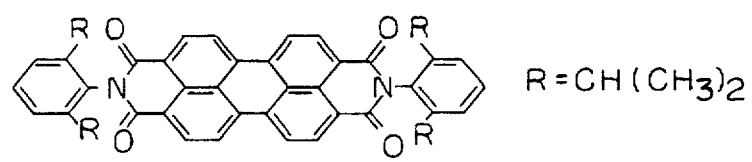
FIG. 15 illustrates the structure of Lumogen LFR 240.
Figure 16:
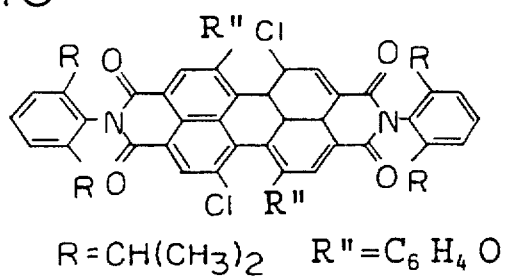
FIG. 16 illustrates the structure of Lumogen LFR 300.
Figure 17:
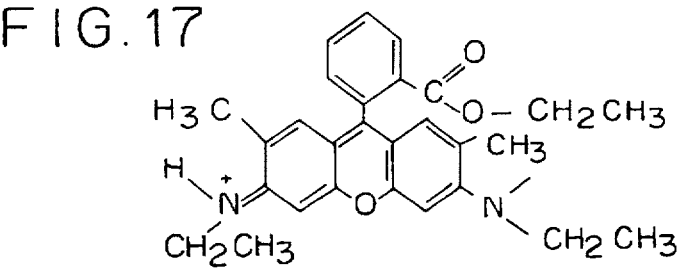
FIG. 17 illustrates the structure of Rhodamine 6G.

A composite glass film was prepared as described above in Example 2, using 20% molar of titanium tetraisopropoxide instead of silicon tetraethoxide, and doped by Lumogen LFR 240 dye. The derived solid composite material contains 43 mass. % of silica and 7 mass. % of titania, while the rest consists of organic and polymer moieties. The laser spectrum is given in FIG. 12, as compared to that of spontaneous emission, when a resonator cavity was made by two partially transparent mirrors, butted and merged directly to the waveguide ends with the aid of epoxy glue.

Table 1 presents the laser dyes used in the above examples, and summarizes the lasing range and the threshold of laser operation.

the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A composite glass film waveguide tunable dye laser, said film comprising:
   a. about 10–80 wt. % of a multiplicity of cross-linked networks of silica, said silica networks being optionally modified to include hydrocarbon chains having 2–6 carbon atoms and containing at least one double bond or an oxiran group;
   b. about 20–90 wt. % of a network-forming or network-modifying amount of a metal oxide selected from the group consisting of titania, zirconia, alumina, germania, yittria, or a mixture thereof; and
   c. about 20–90 wt. % of a multiplicity of polyacrylate chains intertwined with said networks, wherein said film is doped with a tunable organic monomeric laser dye and deposited on a substrate, said film having a higher refractive index than that of said substrate.

2. A composite glass film waveguide tunable dye laser according to claim 1, wherein said metal oxide is selected from the group consisting of alumina, titania, zirconia, and mixtures thereof.

3. A composite glass film waveguide tunable dye laser according to claim 1, comprising 30–65 wt. % titania.

4. A composite glass film waveguide tunable dye laser according to claim 1, comprising 30–65 wt. % zirconia.

5. A composite glass film waveguide tunable dye laser according to claim 1, comprising 30–90 wt. % alumina.

6. A composite glass film waveguide tunable dye laser, according to claim 1, wherein said silica networks include $C_2$–$C_6$ carbon chains having at least one double bond.

7. A composite glass film waveguide tunable dye laser, according to claim 1, wherein said silica networks include vinyl moieties attached thereto.

8. A composite glass film waveguide tunable dye laser, according to claim 1, wherein said silica networks include $C_2$–$C_6$ carbon chains having an epoxy moiety as a part thereof.

9. A composite glass film waveguide tunable dye laser, according to claim 1, wherein said silica network is formed from alkoxysilane precursors.

10. A composite glass film waveguide tunable dye laser, according to claim 9, wherein said alkoxysilane precursors have 1 to 4 carbon atoms in each of said alkoxy groups.

TABLE 1

Spectral characteristics of the dyes used for glass films doping.

| Dye | Abs. max, nm | Tuning range, nm | Spontaneous emission spec. width, nm | Laser Spec. width, nm | Threshold, µJ/pulse |
|---|---|---|---|---|---|
| Lumogen LFR 300 | 578 | 605–630 | 70 | 9 | 30 |
| Lumogen LFR 240 | 525 | 568–583 | 30 | 3 | 100 |
| R6G | 546 | 560–610 | 44 | 11 | 50 |
| DCM | 472, 496 | 595–650 | 79 | 19 | 100 |
| Rhodamine 610 | 560 | 585–635 | 45 | 10 | 40 |

It will be evident to those skilled in the art that the invention is not limited to the details of the foregoing illustrated embodiments and that the present invention may be embodied in other specific forms without departing from 11. A composite glass film waveguide tunable dye laser, according to claim 9, wherein said precursors are tetraalkoxysilanes.

12. A composite glass film waveguide tunable dye laser, according to claim 11, wherein said precursors are tetraalkoxysilanes intermixed with a trialkoxysilane derivative having a $C_2$–$C_6$ unsaturated aliphatic chain with one or two double bonds.

13. A composite glass film waveguide tunable dye laser, according to claim 11, wherein said precursors are tetraalkoxysilanes intermixed with a trialkoxysilane derivative having a $C_2$–$C_6$ unsaturated aliphatic chain having an epoxy moiety as a part thereof.

14. A composite glass film waveguide tunable dye laser, according to claim 1, wherein said polyacrylate chains are formed from polyacrylates of the general formula I:

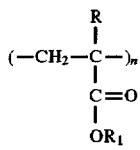

wherein:

R is hydrogen, methyl or ethyl;

$R_1$ is hydrogen, methyl or ethyl, and n is a whole integer greater than 100.

15. A composite glass film waveguide tunable dye laser, according to claim 1, wherein the molar ratio of said hydrocarbon chains to silicon atoms in said network is about 0.5:1 to 1:1.

16. A composite glass film waveguide tunable dye laser, according to claim 1, wherein said silica networks are formed from the copolymerization of gamma-glycidyloxipropyl-trimethoxysilan and titanium tetraethoxide.

17. A composite glass film waveguide tunable dye laser, according to claim 1, wherein said silica networks are formed from the copolymerization of gamma-glycidyloxipropyl-trimethoxysilan and titanium tetraisopropoxide.

18. A process for the preparation of a composite glass film waveguide tunable dye laser, comprising:

about 10–80 wt. % of a multiplicity of cross-linked networks of silica, said silica networks being optionally modified to include hydrocarbon chains having 2–6 carbon atoms and containing at least one double bond or an oxiran group; and about 20–90 wt. % of a multiplicity of polyacrylate chains intertwined with said networks and doped with a tunable organic monomeric laser dye, said process comprising the steps of:

a) forming a solution of at least one alkoxysilane precursor, water, ethanol and a catalyst to effect the hydrolysis of said precursor;

b) adding a solvent selected from the group consisting of benzene and toluene;

c) effecting azeotropic distillation of the resulting solution to remove water and alcohol;

d) adding glacial acetic acid and distilling off said original solvent while adding a tunable organic monomeric laser dye, whereby said benzene or toluene are replaced with glacial acetic acid and any water entrained in said dye is removed by said distillation;

e) introducing a polyacrylate of the general formula I:

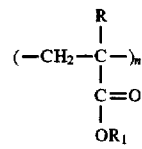

wherein:

R is hydrogen, methyl or ethyl;

$R_1$ is hydrogen, methyl or ethyl, and n is a whole integer greater than 100 into the remaining solution; and f) distilling off said glacial acetic acid, whereby there is formed a silica polymer composite glass solution doped with a tunable organic monomeric laser dye and suitable for thin layer coating on a substrate having a refractive index lower than that of said film, to form a composite glass film waveguide tunable dye laser.

19. A process according to claim 18, wherein said alkoxysilane precursors have 1 to 4 carbon atoms in each of said alkoxy groups.

20. A process according to claim 18, wherein said precursors are tetraalkoxysilanes.

21. A process according to claim 18, wherein said precursors are tetraalkoxysilanes intermixed with a trialkoxysilane derivative having a $C_2$–$C_6$ unsaturated aliphatic chain with one or two double bonds.

22. A process according to claim 18, wherein said precursors are tetraethoxysilane and triethoxyvinylsilane.

23. A process according to claim 18, wherein said polyacrylate is polymethylmethacrylate.

24. A process according to claim 18, wherein said catalyst is an acid catalyst.

25. A process according to claim 24, wherein said catalyst is selected from the group consisting of glacial acetic acid, hydrochloric acid and sulfuric acid.

26. A process according to claim 18, wherein said dye is Rhodamine 610.

27. A process according to claim 18, wherein said dye is DCM.

28. A process according to claim 18, wherein said dye is Lumogen LFR 240.

29. A process according to claim 18, wherein said dye is Lumogen LFR 300.

30. A process according to claim 18, wherein said dye is Rhodamine 6G.

31. A process for the preparation of a composite glass film waveguide tunable dye laser, comprising:

about 10–80 wt. % of a multiplicity of cross-linked networks of silica, said silica networks being optionally modified to include hydrocarbon chains having 2–6 carbon atoms and containing at least one double bond or an oxiran group;

about 20–90 wt. % of a network-forming or network-modifying amount of a metal oxide selected from the group consisting of titania, zirconia, alumina, germania, yittria, or a mixture thereof, and doped with a tunable organic monomeric laser dye, said process comprising the steps of:

a) forming a solution of at least one alkoxysilane precursor, a tunable organic monomeric laser dye, a metal alkoxide precursor and ethanol and effecting the hydrolysis of said metal alkoxide precursor by stirring the solution in an atmosphere saturated with water vapor; and b) adding water with catalyst, to effect the hydrolysis of said alkoxysilane precursor;

whereby there is formed a silica metal oxide composite glass solution doped with a tunable organic monomeric laser dye and suitable for thin layer coating as a film on a substrate having a refractive index lower than that of said film, to form a composite glass film waveguide tunable dye laser.

32. A process for the preparation of a composite glass film waveguide tunable dye laser, comprising:

about 10–80 wt. % of a multiplicity of cross-linked networks of silica, said silica networks being optionally modified to include hydrocarbon chains having 2–6 carbon atoms and containing at least one double bond or an oxiran group;

about 20–90 wt. % of a network-forming or network-modifying amount of a metal oxide selected from the group consisting of titania, zirconia, alumina, germania, yittria, or a mixture thereof, and doped with a tunable organic monomeric laser dye, said process comprising the steps of:

a) forming a solution of at least one metal alkoxide, alcohol selected from the group consisting of ethanol, propanol and butanol, carboxylic acid selected from the group consisting of acetic acid and propanoic acid, and at least one organically modified silane;

b) adding a tunable organic monomeric laser dye in concentration of from $10^{-2}$ to $10^{-4}$M;

c) boiling the solution under reflux for several hours for homogenous generation of water by the esterification reaction of the alcohol and the carboxylic acid;

d) filtering the solution through a 0.1–0.2 mm pore size membrane;

e) dip-coating or spin-coating on a glass or quartz substrate having a refractive index lower than that of said coating film;

whereby there is formed a metal organically-modified silica composite glass film tunable dye laser doped with a tunable organic monomeric laser dye.

33. A process for the preparation of a composite glass film waveguide tunable dye laser, comprising:

about 10–80 wt. % of a multiplicity of cross-linked networks of silica, said silica networks being optionally modified to include hydrocarbon chains having 2–6 carbon atoms and containing at least one double bond or an oxiran group;

about 20–90 wt. % of a network-forming or network-modifying amount of a metal oxide selected from the group consisting of titania, zirconia, alumina, germania, yittria, or a mixture thereof; and about 20–70 wt. % of a multiplicity of polyacrylate chains intertwined with said networks and doped with a tunable organic laser dye, said process comprising the steps of:

a) forming a solution of at least one alkoxysilane precursor, a tunable organic manomeric laser dye, a metal alkoxide precursor and ethanol and effecting the hydrolysis of said metal alkoxide precursor by stirring the solution in an atmosphere saturated with water vapor; and b) adding water with catalyst, to effect the hydrolysis of said alkoxysilane precursor;

c) adding a solvent selected from the group consisting of benzene and toluene;

d) effecting azeotropic distillation of the resulting solution to remove water and alcohol;

e) adding glacial acetic acid and distilling off said original solvent while adding an indicator dye, whereby said benzene or toluene are replaced with glacial acetic acid and any water entrained in said dye is removed by said distillation;

f) introducing a polyacrylate of the general formula I:

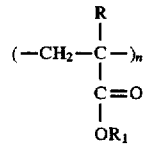

wherein:

R is hydrogen, methyl or ethyl;

$R_1$ is hydrogen, methyl or ethyl, and n is a whole integer greater than 100 into the remaining solution; and g) distilling off said glacial acetic acid, whereby there is formed a silica-polymer composite glass solution doped with a tunable organic monomeric laser dye and suitable for thin layer coating on a substrate having a refractive index lower than that of said film, to form a composite glass film waveguide tunable dye laser.

34. A composite glass film waveguide tunable dye laser according to claim 1, comprising a tubular substrate.

35. A composite glass film waveguide tunable dye laser, according to claim 1, comprising a planar substrate.

36. The laser of claim 1 wherein said film comprises at least 30 wt. % of the metal oxide.

37. The laser of claim 1 wherein the laser dye is dispersed in a monomeric form in said film.

38. The process of claim 18 wherein the laser dye is dispersed in a monomeric form in said film.

39. The process of claim 31 wherein the laser dye is dispersed in a monomeric form in said film.

40. A composite glass film waveguide tunable dye laser, said film comprising:

a. about 10–80 wt. % of a multiplicity of cross-linked networks of silica, said silica networks being optionally modified to include hydrocarbon chains having 2–6 carbon atoms and containing at least one double bond or an oxiran group;

b. about 0–90 wt. % of a network-forming or network-modifying amount of a metal oxide selected from the group consisting of titania, zirconia, alumina, germana, yittria, or a mixture thereof; and c. about 0–70 wt. % of a multiplicity of polyacrylate chains intertwined with said networks, wherein said film is doped with a tunable organic monomeric laser dye dispersed in a monomeric form in said film, said film being deposited on a substrate and having a higher refractive index than that of said substrate.

* * * * *